W. B. McMILLEN & W. J. BASSETT.
CHEESE CUTTER.
APPLICATION FILED NOV. 11, 1916.

1,264,106.

Patented Apr. 23, 1918.
2 SHEETS—SHEET 1.

Witness
F. C. Gibson.
Edward Yeager

Inventor
Walter B. McMillen.
William J. Bassett.
By Victor J. Evans
Attorney

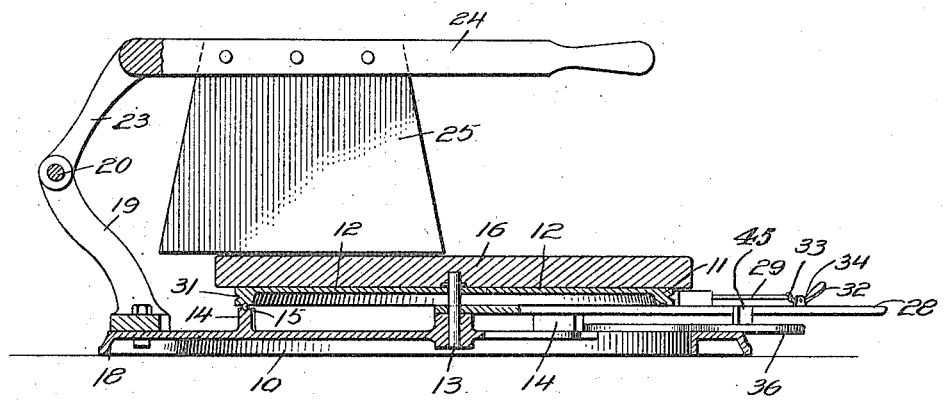
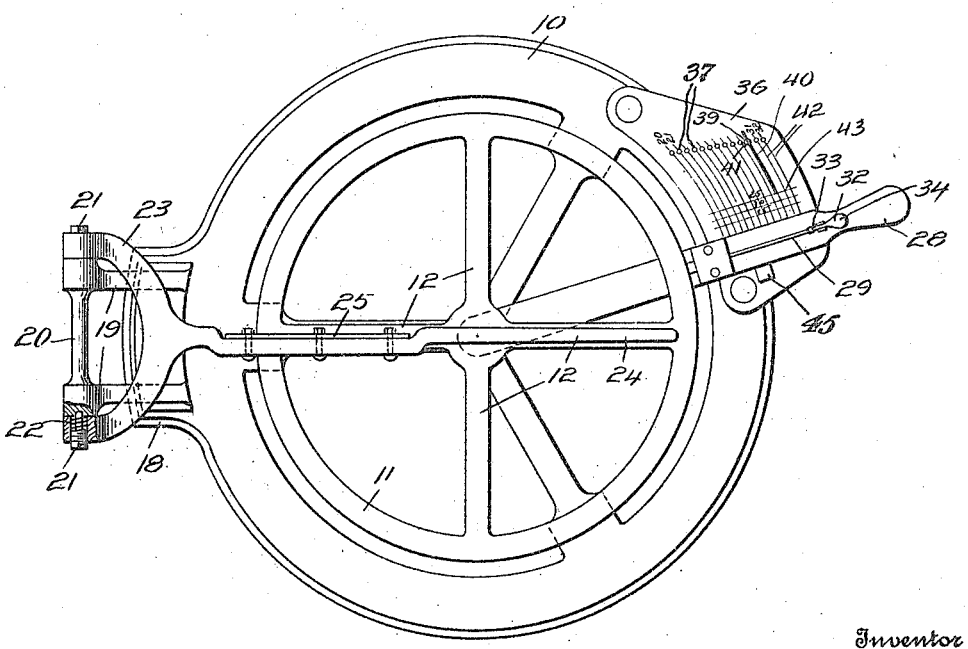

UNITED STATES PATENT OFFICE.

WALTER B. McMILLEN AND WILLIAM J. BASSETT, OF SAN FRANCISCO, CALIFORNIA.

CHEESE-CUTTER.

1,264,106.  Specification of Letters Patent.  Patented Apr. 23, 1918.

Application filed November 11, 1916. Serial No. 130,845.

*To all whom it may concern:*

Be it known that we, WALTER B. McMILLEN and WILLIAM J. BASSETT, citizens of the United States, residing at San Francisco, in the county of San Francisco and State of California, have invented new and useful Improvements in Cheese-Cutters, of which the following is a specification.

This invention comprehends the provision of a machine primarily designed for cutting or slicing cheese, although it can be used in other capacities, and having for its chief characteristic the provision of means whereby the cheese can be alternately cut from two of its sides, with a view of preventing the cheese from becoming dry on one side with a consequent loss to the dealer.

In carrying out the invention we provide a means whereby the machine may be regulated to cut any predetermined quantity of cheese, consistent with the weight, quality and price of the latter.

The invention further embodies the desired features of simplicity, and durability, and can be conveniently manipulated for the purpose intended.

The nature and advantages of the invention will be better understood when the following description is read in connection with the accompanying drawings, the invention residing in the construction, combination and arrangement of parts as claimed.

In the drawings forming part of this specification like numerals of reference indicate similar parts in the several views and Figure 1 is a side elevation of the machine constructed in accordance with our invention.

Fig. 2 is a sectional side elevation.

Fig. 3 is a top plan view with the cheese holder or table removed.

Figure 1:
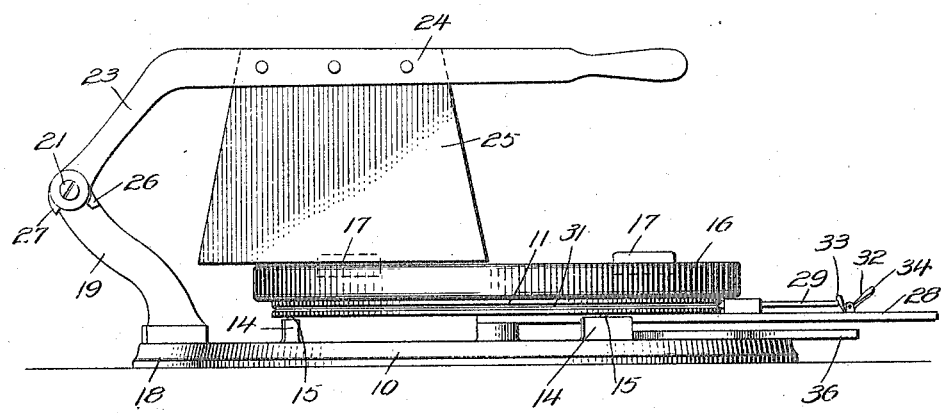
Figure 4:
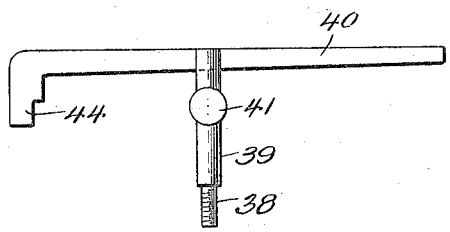
Fig. 4 is an enlarged detail view of the adjustable stop.
Figure 6:
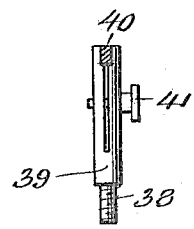
Figure 5:
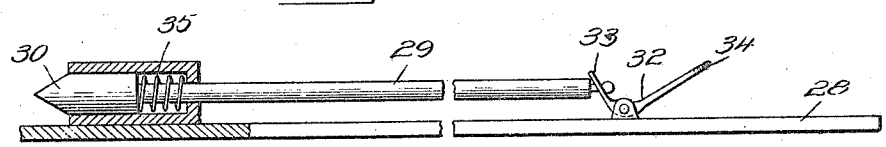
Fig. 5 is a detail view of the catch.

A machine constructed in accordance with our invention embodies a base 10 which may be constructed from any suitable material and design, but which is preferably formed from metal and having a circular outline. An annulus 11 which is reinforced by means of the spokes 12 is journaled upon a center pin 13 rising from the base 10, and held spaced from the base by means of segmental supports 14, anti-frictional bearings 15 being provided to facilitate rotation of the annulus. Secured to the center pin 15 and resting upon the annulus for rotation therewith is the cheese holder or table 16 which is preferably constructed from wood, while rising from the table 16 is a plurality of relatively small knives or other suitable projections 17 which embed themselves within the cheese when the latter is placed upon the table, and serve to hold the cheese fixed relatively thereon.

The base 10 is provided with a rearward extension 18, secured upon which are spaced parallel standards 19 connected by means of a cross piece 20, the opposite extremities of which are adapted to receive a screw 21 provided with a spring 22, each screw passing through one extremity of a yoke 23 formed on one end of a handle 24 from which the cutting blade 25 depends. The yoke end of the handle is pivotally mounted to permit the handle and cutting blade 25 to be moved toward and away from the table 16 as the occasion requires, the spring 22 functioning to hold the handle 24 in its elevated position. The standards 19 are provided with an abutment 26 adapted to be engaged by the extensions 27 on the yoke end of the handle for the purpose of limiting the movement of the latter in an upward direction.

The table 16 can be rotated in various ways and for the purpose of bringing the particular portion of the cheese to be cut in proper position with respect to the cutting blade 25, but as shown in this particular instance I preferably make use of a lever 28 having one end loosely embracing the center pin 13 which forms a pivot for the lever. As shown the lever is positioned between the base 10 and the annulus 11 and carries a spring pressed latch element 29 in the nature of a rod. The rod has an enlarged beveled extremity 30 adapted to normally engage the elevation or grooved periphery 31 of the annulus 11, so that upon movement of the lever 28 the annulus 11 and table 16 as a unit will be rotated in either one or the other direction, depending of course upon the particular direction in which the lever is manipulated. A bell crank lever 32 is pivoted upon the lever 28 on the outer extremity of the latch element 30, and has one of its limbs 33 connected with said latch element so that when its opposite limb 34 is depressed the latch element will be retracted against the tension of its spring 35 away from the peripheral edge of the annulus when it is desired to rotate the table 16 independently of the lever 28. The purpose for this independent rotation of the table will be hereinafter clearly set forth.

Secured to the base 10 and projecting beyond the edge thereof is a plate 36 above which the lever 28 operates. The plate is provided with a transverse series of openings 37 adapted to interchangeably receive the threaded extremity 38 of a relatively short post 39, which latter has its upper extremity bifurcated to receive a substantially L-shaped arm 40. Manifestly the arm 40 is susceptible of adjustment at right angles to the post 39, and is held fixed relatively to the latter in any of its adjusted positions by means of a set screw 41 which when tightened causes the separated portions of the post defined by the bifurcation to effectively clamp therebetween the arm 40. The plate 36 at an appropriate distance away from the openings 37 is provided with a plurality of spaced parallel lines 43 indicative of the selling price, three of these lines being shown in this particular instance, with one of the numerals 25, 30 and 35 cents arranged adjacent each of the respective lines 43. The openings 37 in addition to receiving the post 39 indicate the weight of the particular quantity of cheese or other material initially placed upon the table 16, these openings as shown in this instance ranging from twenty to thirty-two pounds, or in other words there being one opening for each pound. The purpose of this plate and the particular disposition of the openings 37, and the lines 43, is to permit any predetermined quantity of cheese to be severed from the holder as desired. For instance the lines 43 are so positioned with respect to the openings 37, that when the post 39 is positioned in one of the openings 37, with the offset terminal 44 of the L-shaped arm arranged upon one of the lines 43, the lever 28 is permitted a movement between the fixed stop 45 on the plate 36 which it engages in its normal position, to the offset terminal 44 of the L-shaped arm. This limited movement of the lever rotates the table 16 the required distance to bring that portion of the cheese in advance of the cutting blade 25 which represents five cents' worth of the cheese, and subsequent to the operation of the lever 28 for this purpose, the handle 24 is manipulated to sever this quantity of cheese from the whole. If desired the plate 36 may be provided with spaced parallel lines 42, one line leading from each of the openings 37, and intersecting the lines 43, the lines 42 serving as a guide to permit the user of the device to quickly and yet properly adjust the arm 40. However, these lines 42 are not essential, and may be eliminated.

In practice the weight of the cheese as a whole is first obtained, and the cheese subsequently placed upon the holder or table 16. The post 39 is then positioned within the particular opening 37 corresponding to the weight of the cheese. The L-shaped arm 40 is then adjusted to position the offset terminal 44 on the particular line indicative of the price of the cheese, as it will be readily understood from the arrangement of the numerals 25, 30 and 35 cents, that a less quantity of the higher price cheese is obtained than that of the lower price cheese for the same sum, namely five cents. If the price of the cheese varies between 25 and 35 cents, say for instance 27 cents, 32 cents or the like, the offset terminal 44 can then be properly positioned between the lines 43 consistent with the selling price of the cheese. In the normal position of the lever 28, the same engages the fixed stop 45, and subsequent to raising the handle 24 for the purpose of moving the blade 25 above the cheese supported upon the table 16, the lever 28 is moved from the fixed stop 45 in the direction of the offset terminal 44 until it abuts against the latter, checking further movement of the lever. During this movement of the lever the table 16 is rotated a predetermined distance consistent with the quantity of cheese to be severed from the whole, it being manifest that during this rotation of the table a portion of the cheese equal to five cents' worth is moved to one side of the cutting blade 25, to be severed thereby from the whole when the handle 24 is lowered. It is possible to sever one pound of cheese with a single operation of the lever 28 and the handle 24, which is accomplished by initially adjusting the L-shaped arm upwardly out of the path of the lever 28, which permits the latter to be moved from the fixed stop 45 to the post 39, a distance sufficient to rotate the table or holder 16 far enough to move a portion of the cheese equal to one pound, to one side of the cutting blade 25, so that when the latter is lowered this particular portion of the cheese is severed from the whole. Irrespective of the quantity of cheese severed from the whole, the machine permits of the cheese being alternately cut from one side and then the other, with a view of preventing either side of the cheese from drying, and resulting in a consequent loss to the dealer. For instance should the lever be moved from the fixed stop 45 to the offset terminal 44 of the L-shaped arm, thus rotating the table in one direction for the sale of five cents' worth of cheese, this quantity of course would be cut off from one side of the whole. For the next sale of any predetermined quantity of the cheese, the lever 32 is manipulated to draw the latch element 29 out of engagement with the table 16, thereby releasing the lever from the latter. The lever is then permitted to remain in its adjusted position, or in other words against the offset terminal of the L-shaped arm, while the table or holder 16 is free to be rotated by hand in a direction opposite to that from which it was rotated by means of the lever until the opposite side of the cheese is brought into contact with the cutting blade 25. The lever 32 is then released to permit the latch element 29 to engage the grooved periphery of the annulus 11, so that upon adjustment of the lever in a reverse direction, or in other words in the direction of the fixed stop 45, the table will be rotated in a similar direction to move the cheese to a position whereby the predetermined quantity of cheese desired can be severed from the opposite side of the whole.

Manifestly from the foregoing description it will be noted that the cheese has so far been disposed of in five cent quantities, and by the pound, but should ten or fifteen cents or any other quantity of cheese be desired, within the limits of a pound, the cheese is sold in multiples of five cents' worth. In other words should the lever 28 be moved from the fixed stop 45 to the offset terminal 44 of the arm, thereby rotating the table 16 a predetermined distance to permit a quantity of five cents' worth of cheese to be severed from the whole, the latch element is released by depressing the lever 32, which allows the lever 28 to be returned to its normal position against the fixed stop 45 without having any effect upon the table or holder 16. The lever 28 is then the second time adjusted in the direction of the offset terminal 44 of the arm, which manifestly rotates the table a distance equal to twice its initial adjustment, whereby a portion of cheese equal to ten cents' worth can be severed from the whole. This operation is repeated as often as necessary in order to obtain the predetermined quantity of cheese between five cents' worth and a pound.

It is felt that from the foregoing description the nature and advantages of the invention will be readily apparent, but we desire to have it understood that what is herein shown and described is merely illustrative of the preferred embodiment of the invention to which we do not limit ourselves, and that such changes in the construction, combination and arrangement of parts may be resorted to when desired as fall within the scope of what is claimed.

What is claimed is:—

1. A machine of the class described comprising a base, a revoluble cutter board mounted thereon, means for revolving the same including a lever, a plate secured to the base beneath said lever, indicia on said plate indicative of weight, indicia on said plate indicative of the selling price, an element adjustably mounted upon the plate and coöperating with the respective indicia to vary the degree of movement of said lever, said element constituting a stop for the lever for the purpose described.

2. A machine of the class described comprising a base, a cutter board rotatably mounted thereon, means for rotating said board including a lever, a plate secured to the base beneath said lever and having indicia thereon indicative of weight, indicia on said plate indicative of the selling price, the latter indicia being spaced various distances away from the indicia indicative of the weight, an adjustable element mounted upon the plate and coöperating with the respective indicia to permit the lever different degrees of adjustment, said element constituting a stop for the lever for the purpose described.

3. A machine of the character described comprising a base, a cutter board rotatably mounted thereon, means for rotating the board including a lever, indicia on said base indicative of the weight and selling price of the material supported on said board, a post adapted to be associated with the base and positioned on the indicia indicating the weight of the material arranged upon the board, a fixed stop on said base, a second stop adjustably associated with the post and adapted to be moved toward and away from the fixed stop, said movable stop coöperating with the indicia and indicative of the selling price, for varying the movement of said lever consistent with the weight and selling price of the material on the board as described.

4. In a machine of the class described, a base, a cutter board rotatably mounted thereon, means for rotating the board including a lever, a spring pressed latch element associated with the lever and engaging said board, whereby the board may be rotated upon swinging of the lever, means for effecting a release of said element to permit movement of the lever independently of the carrier, a plate secured to the base beneath said lever, indicia on said plate indicative of the weight and selling price of the material supported on the board, and an element adjustably mounted upon the plate and coöperating with said indicia to vary the degree of movement of said lever, said element constituting a stop for the lever for the purpose specified.

5. A machine of the class described comprising a base, a cutter board rotatably mounted thereon, a plate secured to the base and having a row of openings, indicia disposed in proximity to said openings whereby each of the latter indicates a particular weight, indicia on said plate indicative of the selling price of the material supported on the board, means for rotating said board including a lever mounted to swing across said plate, a plug adapted to be fitted in one of said openings according to the weight of the material supported on said board, an element adjustably supported by said plug and adapted to coöperate with the indicia representing the selling price of the material to vary the degree of rotation of said board, and said element constituting a stop for said lever.

In testimony whereof we affix our signatures.

WALTER B. McMILLEN.
WILLIAM J. BASSETT.